United States Patent [19]

Frank et al.

[11] 4,135,813
[45] Jan. 23, 1979

[54] CAMERA WITH FLASH EXPOSING DEVICE

[75] Inventors: John W. Frank, St. Paul; Lawrence M. Lucking, May Township, Washington County, both of Minn.

[73] Assignee: Minnesota Mining & Manufacturing Company, St. Paul, Minn.

[21] Appl. No.: 799,250

[22] Filed: May 23, 1977

[51] Int. Cl.² ............................................. G03B 27/76
[52] U.S. Cl. .................................................... 355/71
[58] Field of Search ............................. 355/70, 71, 19

[56] References Cited

U.S. PATENT DOCUMENTS

| | | | |
|---|---|---|---|
| 2,621,569 | 12/1952 | Glassey | 355/71 X |
| 2,705,907 | 4/1955 | Caps et al. | 355/71 |
| 3,040,640 | 6/1962 | Abel et al. | 355/19 |
| 3,249,000 | 5/1966 | Pack | 355/70 X |
| 3,619,055 | 11/1971 | Archer et al. | 355/70 X |

Primary Examiner—Donald A. Griffin
Attorney, Agent, or Firm—Cruzan Alexander; Donald M. Sell; John C. Barnes

[57] ABSTRACT

A camera for photosensitive material used in producing half tones wherein a device for flash exposing the image to create better half tones is afforded by the use of a low wattage lamp projecting light along the optical path of the lens from the shutter, through a screen and onto the film plane for the photosensitive materials. The light is so directed by a specular reflective surface on the back of the shutter and a lamp off axis directing light to the reflective surface. Timing for the flash exposure is provided by commercial circuitry.

8 Claims, 3 Drawing Figures

CAMERA WITH FLASH EXPOSING DEVICE

BACKGROUND OF THE INVENTION

1. Field of the Invention

This invention relates to an improvement in cameras for exposing photosensitive materials for producing half tone or similar images and in particular to an improved structure for "flash" exposing the photosensitive materials.

2. Description of the Prior Art

Previous to the present invention photosensitive printing plate material having half tone quality could be exposed by using a projection type glass screen with opaque ruled lines. For a given screen and aperture the optimum distance for the screen from the receptor material was calculated to produce the properly formed half tone dots. Once a main exposure was achieved, a "flash" exposure using an all white overlay on the copy board was used to reexpose the plate to lighten the photograph's darkest areas. This effectively reduced the overall contrast of the half tone copy and extends the screen range.

Other attempts in the prior art to provide the flash exposure without using the white overlay on the copy board have been attempted. One attempt was to use a lamp positioned off the optical path or, to balance illumination, by using multiple bulbs spaced symmetrically about the projection lens. In each of these instances the result was that the quality of the dots was compromised. When the path of the light used for flash exposure from the source to the photoplane follows a different path through the screen than that of the originally projected light, the dot quality is affected.

The use of an all white overlay on the copy board, such that the flash exposure is through the same lens and along the same optical path, increases the time spent by the camera operator when this time could be better spent placing the next image to be photographed on the copy board.

The present invention therefore has provided a method for obtaining flash exposure to improve half tone reproduction and at the same time to reduce the time necessary in making each of the exposures without compromising the quality.

The present invention has afforded a means for effectively centering the flash illumination along the optical path and inside the bellows or light-tight enclosure. The present exposure structure is so located that it moves with the lens when changing magnification ratios and it is out of the way during the main exposure of the image from the copy board. Further, it allows daylight camera operation.

SUMMARY OF THE INVENTION

The present invention affords an improvement to camera such that the same can be utilized in the exposure of photosensitive materials for making half tone images. The present invention comprises the improvement of the camera by providing means within the camera, between the shutter and the photoplane, for projecting light along the optic axis for "flash" exposing the photosensitive materials through the screen. This means may comprise a light-weight specularly reflective surface supported on the back of the shutter with the reflective surface at an angle to the optical axis of the projection lens of the camera and positioning a shrouded point source of light next to the lens and positioned such that the light will be directed from the reflective surface onto the film plane. The light source is shrouded such that the plate material cannot see the light directly and the mirror is so positioned that when the shutter opens for the main exposure, the mirror is out of the way of the light image. Upon closing of the shutter the mirror or specularly reflective surface reflects the point source of light back to the film plane to effect the "flash" exposure through the screen to the plate material. Timing for the exposure is afforded by suitable commercially available electronic circuitry.

DESCRIPTION OF THE ACCOMPANYING DRAWINGS

FIG. 1 discloses a side view of a photographic printing plate camera, with portions thereof being shown in section to disclose interior components;

FIG. 2 is a fragmentary horizontal sectional view of the camera lens bellows and film plane of the camera of FIG. 1; and FIG. 3 is a vertical sectional view taken through the bellows of FIG. 2.

DETAILED DESCRIPTION OF THE PRESENT INVENTION

Figure 1:
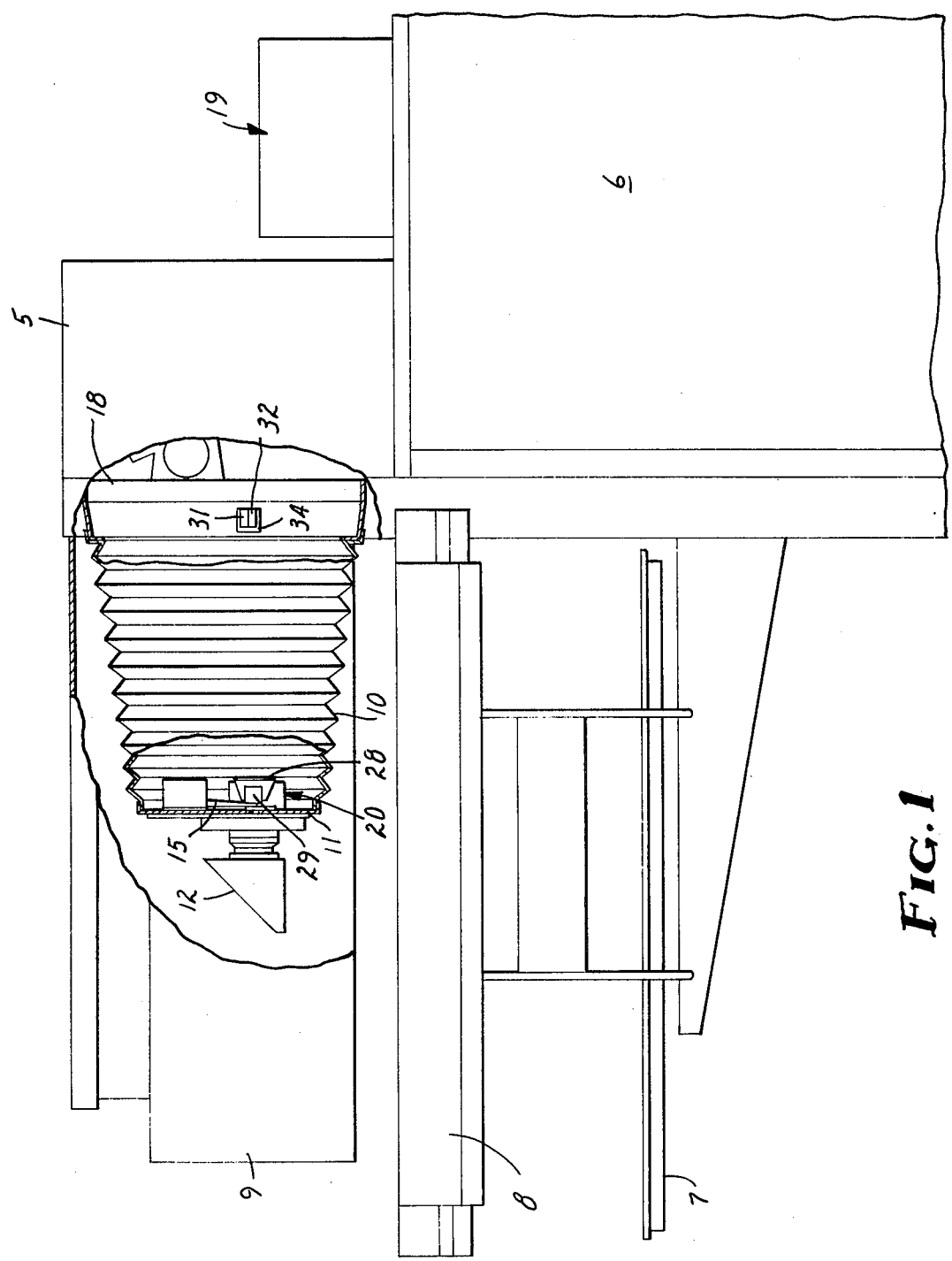

Referring now to FIG. 1 there is illustrated a camera for the exposure of photosensitive material suitable for producing half tone images. The camera comprises a magazine section generally designated 5 for storing a supply roll of the photosensitive material. On the front surface of the magazine 5 is a vacuum film plane to maintain the photosensitive material in the proper film plane. The material may be positive paper stat material or photosensitive printing plate materials. A processor unit 6 is provided for automatically processing the photosensitive material, a vertically adjustable copy board 7 upon which to place the images to be photographed onto the plate material; lamps and lamp shrouds 8 for illuminating the copy on the copy board; and an upper housing 9 adjustably supporting a camera with a light-tight enclosure. The camera has a bellows 10 having a front support plate 11 on the front of which is supported a projection lens assembly 12. The lens assembly 12 comprises a specular reflective surface for reflecting light images from the copy board into the pupil of the objective lens which is provided with a suitable iris for controlling the effective aperture and adjustable, either manually or automatically, upon movement of the support plate 11 toward and away from the film plane to adjust the magnification of the image on the film plane. Positioned behind the support plate 11 is a solenoid operated shutter 15 covering an opening in the support plate and the year lens aperture.

To produce half tone images a glass screen 16 of a suitable mesh is disposed in front of and spaced from the vacuum film plane 18. The original on the copy board 7 is measured on a photodensitometer to obtain a measurement of the highlight and shadow areas of each picture. These measurements are then compared on a suitable grey scale to determine the proper setting on a suitable timer or control device together with the appropriate screen range for the camera, selected photosensitive material and the processor temperature and condition of the chemicals. The photosensitive material is then exposed and the timing of the exposure through the lens assembly 12 is properly made by a timer generally indicated by the reference numeral 19. The timer 19 then determines the duration of the "flash" exposure necessary for the same variables to provide the desired material exposed to reproduce images when developed having the preferred screen range.

The flash exposure is made by projecting light from a light source within the light-tight enclosure of the camera through the screen 16 onto the photosensitive material along the same optical path as the image from the copy board. The present invention is achieved by a light source generally designated 20 supported on the plate 11 off axis from the optical path of the lens assembly 12 and at a distance substantially equal to the distance to the lens aperture or iris aperture. The light source 20 comprises a shroud 21 positioned about a 7-watt incandescent lamp 22. The shroud 21 has a wall 23 positioned generally perpendicular to the support plate 11 in which is a small opening 25, seen as the light source, through which light may pass from the lamp 22. The small aperture or effective light source reduces the angularity of the light passing through the screen. A diffusing plate may be positioned over the aperture 25 to have a more uniform light appear at the opening from the lamp 22. The aperture 25 preferably has a size smaller than the normal lens aperture or iris aperture size. A specularly reflective surface is supported on the back of the shutter 15 and at an angle of 45° with respect to and symmetrical about the image optical axis through the lens. This reflective surface or mirror 28 is formed of a lightweight material and preferably from a planar piece of polished aluminum. The mirror 28 is mounted by a suitable bracket 29 and is positioned such that incident light at the aperture 25 in the plate 23 will be reflected along the axis of the optical path through the screen 16 to the photosensitive material.

Figure 2:
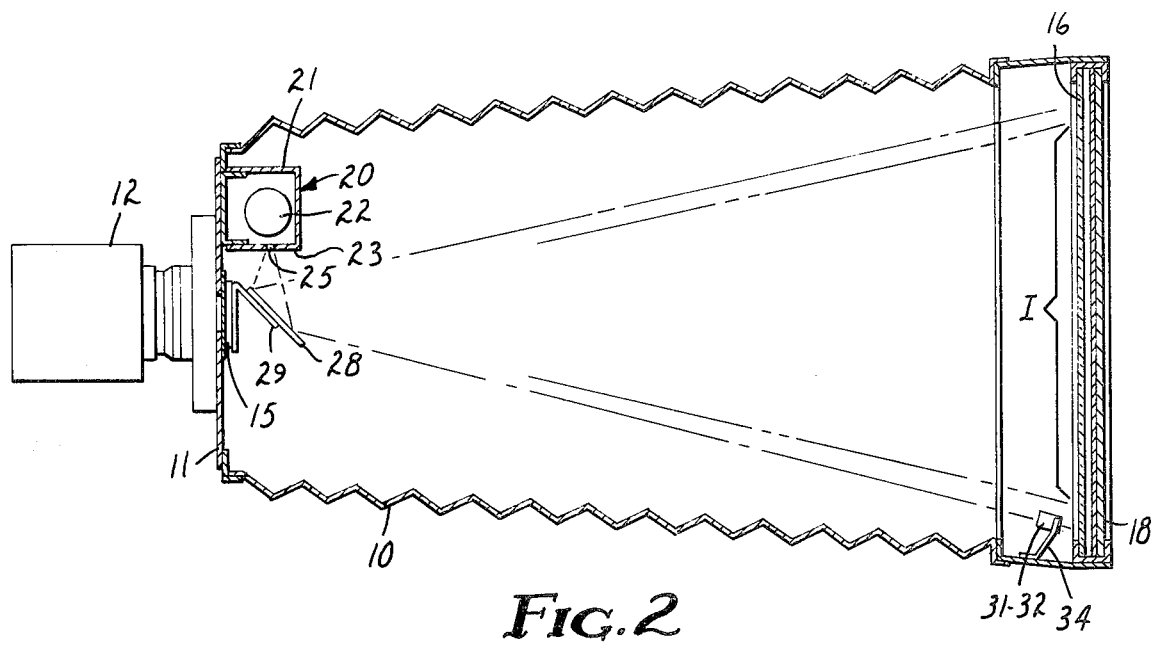
Figure 3:
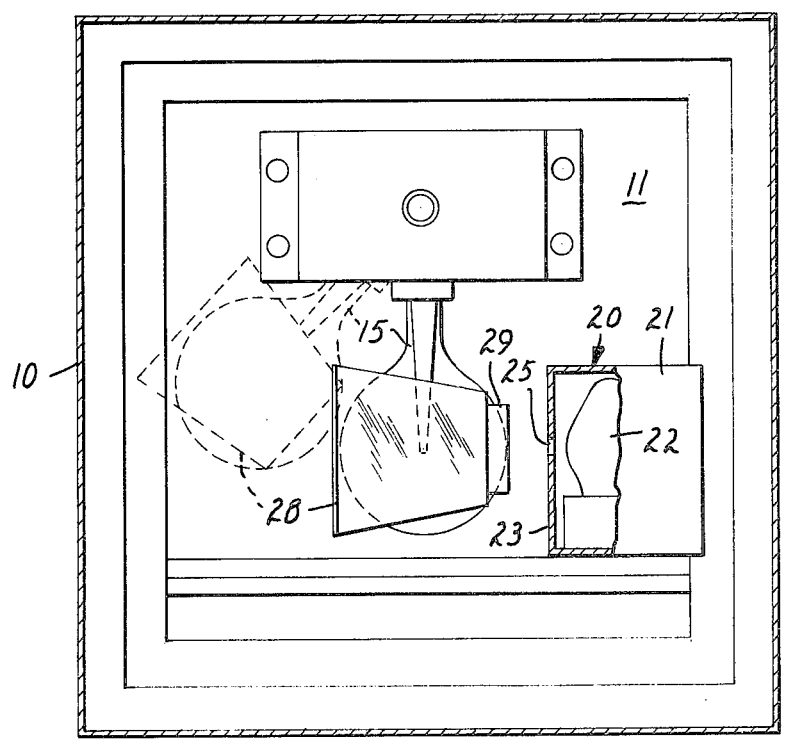

A pair of photocells 31 and 32 are mounted on a bracket 34 adjacent the screen 16 and out of the normal path of the imaging light as represented by the area I, as shown in FIG. 2. The photocells 31 and 32 are however positioned to receive light adjacent to the image which passes through the lens from the copy board and from the bulb 22 toward the screen to measure the amount of light received during imaging and during the flash exposure to produce electrical signals to the timer. A suitable timing device is an exposure computer connected to receive the signals from the photocells and to control the term of exposure from the copy board and from the lamp 22. An example of such an exposure computer is sold under the trade designation Carlson Exposure Computer and it is manufactured by Chesley F. Carlson Company of Minneapolis, Minn. 55426. The timing device is preset from the readings of the densitometer and will thus control the total exposure of the plate material.

Having thus described the present invention with respect to a preferred embodiment please be advised that modifications such as the type of lamp, position of the lamp, or the manner in which the light is directed along the optical axis of the camera may be changed without departing from the spirit or scope of the present invention as defined in the appended claims.

What is claimed is:

1. In a camera for exposing photosensitive material for producing half-tone images and comprising a copy board for supporting the original image, means defining a light-tight enclosure, a lens assembly for projecting an image of said original onto a film plane in said enclosure for supporting light-sensitive material; a shutter for said lens assembly, and a screen supported between said shutter and film plane; the improvement comprising light exposure means for flash exposing said photosensitive material along the optical axis of said lens assembly, said exposure means comprising a source of light disposed within said light-tight enclosure to project light between said shutter and said film plane along said optical axis, and means for energizing said light source for a predetermined time interval.

2. The combination according to claim 1 wherein said last mentioned means comprises light detecting and measuring means disposed adjacent said screen for producing signals in response to imaging light and the flash exposure.

3. The combination according to claim 2 wherein said exposure means comprising a specular reflective surface supported by said shutter and positioned at an angle to the optical axis from the lens assembly to the film plane with the reflective surface generally symmetrical about the optical axis and said source of light is disposed in a position spaced from said shutter and facing said reflective surface to project light from said source along said optical axis toward said film plane.

4. The combination according to claim 1 wherein said exposure means comprising a specular reflective surface supported by said shutter and positioned at an angle to the optical axis from the lens assembly to the film plane with the reflective surface generally symmetrical about the optical axis and said source of light is disposed in a position spaced from said shutter and facing said reflective surface to project light from said source along said optical axis toward said film plane.

5. The combination according to claim 4 wherein said source of light comprises a lamp, a shroud around said lamp, said shroud having a wall facing said reflective surface and said wall having an aperture to reduce the angularity of the light passing through the screen.

6. The combination according to claim 4 wherein the size of said aperture in said shroud is smaller than the effective aperture of said lens assembly.

7. The combination according to claim 6 wherein the aperture in said shroud is spaced from the optical axis of said lens assembly and a point along said axis on said reflective surface a distance substantially equal to the distance from said point on said reflective surface to the effective aperture of said lens assembly.

8. In a camera for exposing photosensitive material for producing half-tone images and comprising a copy board for supporting the original image, a light-tight enclosure comrising a support plate having an opening between a front and rear face and light-tight bellows between said support plate and a film plane, a lens assembly mounted on the front face of said support plate for projecting an image of said original through said opening onto the film plane for supporting light-sensitive material, a shutter for said lens assembly on the rear face of said support plate to cover said opening and complete said light-tight enclosure, a screen supported between said shutter and film plane, a light source for flash exposing said photosensitive material, and means for energizing said light source for a predetermined time interval, the improvement comprising means positioning said light source within said light-tight enclosure and directing light from said light source toward said photosensitive material concentrically with and along the optical axis of said lens assembly.

* * * * *